(12) United States Patent
Xiong

(10) Patent No.: US 7,324,340 B2
(45) Date of Patent: Jan. 29, 2008

(54) CONDUCTIVE COOLING PAD FOR USE WITH A LAPTOP COMPUTER

(76) Inventor: Wei Xiong, 9471 Cortada St., Suite F, El Monte, CA (US) 91733

( * ) Notice: Subject to any disclaimer, the term of this patent is extended or adjusted under 35 U.S.C. 154(b) by 173 days.

(21) Appl. No.: 11/105,627

(22) Filed: Apr. 14, 2005

(65) Prior Publication Data

US 2006/0232935 A1    Oct. 19, 2006

(51) Int. Cl.
*H05K 7/20* (2006.01)
(52) U.S. Cl. ...................................... 361/700
(58) Field of Classification Search ................ 361/700; 439/487; 428/35.2; 206/576; 190/107; 607/117, 96
See application file for complete search history.

(56) References Cited

U.S. PATENT DOCUMENTS

| | | | | |
|---|---|---|---|---|
| 4,649,895 | A | * | 3/1987 | Yasuki et al. .......... 126/263.05 |
| 5,313,362 | A | | 5/1994 | Hatada et al. |
| 5,608,610 | A | | 3/1997 | Brzezinski |
| 6,026,961 | A | * | 2/2000 | McCarthy et al. .......... 206/576 |
| 6,132,455 | A | | 10/2000 | Shang |
| 6,170,561 | B1 | | 1/2001 | O'Grady |
| 6,317,321 | B1 | | 11/2001 | Fitch et al. |
| 6,418,017 | B1 | | 7/2002 | Patel et al. |
| 6,542,359 | B2 | | 4/2003 | Babcock et al. |
| 7,135,036 | B2 | * | 11/2006 | Yue .............................. 607/96 |
| 2003/0124277 | A1 | * | 7/2003 | Agarwal et al. ........... 428/35.2 |
| 2004/0011616 | A1 | * | 1/2004 | Rasmussen ................. 190/107 |
| 2004/0252454 | A1 | | 12/2004 | Chen |
| 2005/0021115 | A1 | * | 1/2005 | Yue ............................ 607/114 |

\* cited by examiner

*Primary Examiner*—Chandrika Prasad
(74) *Attorney, Agent, or Firm*—Lauson & Schewe LLP; Robert J. Lauson; Edward C. Schewe

(57) ABSTRACT

A self contained laptop computer cooling pad that does not require any electrical power to operate and will effectively and efficiently reduce the operating temperature of the computer and reduce the heat being transferred into the user's lap. The cooling pad contains a phase-changing compound such as sodium sulfate decahydrate, sodium carbonate decahydrate, disodium phosphate dodecahydrate or sodium thiosulfate pentahydrate, and may be made of a soft, flexible material that will contain the phase-changing compound and prevent excess shifting within the cooling pad. The cooling pad is placed under the laptop computer when operating the computer to effectively transfer heat away from the computer by conduction and prevent passage onto the user. The cooling pad may be in the form of a sleeve to additionally provide padded storage for the computer when not in use.

18 Claims, 5 Drawing Sheets

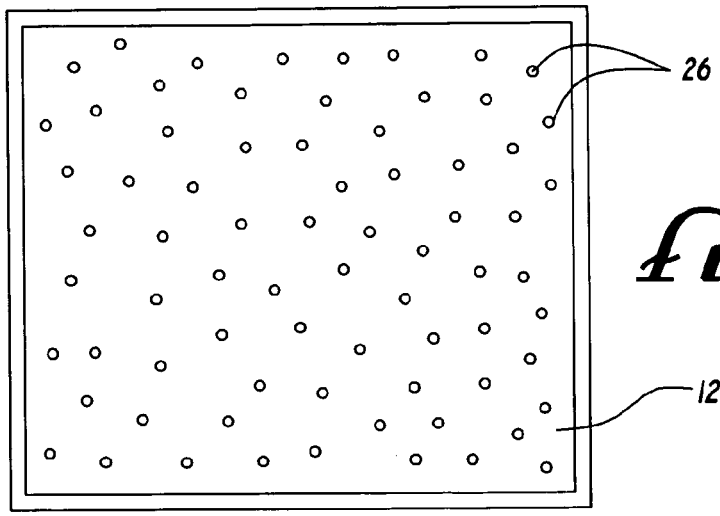
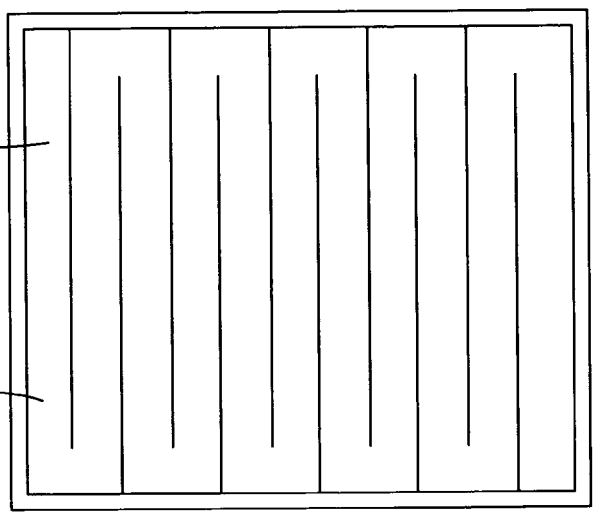
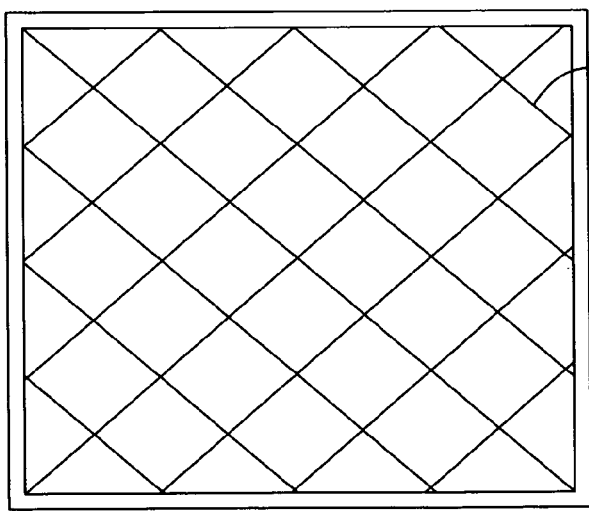

CONDUCTIVE COOLING PAD FOR USE WITH A LAPTOP COMPUTER

BACKGROUND OF THE INVENTION

1. Field of the Invention

The present invention relates generally to a separate, external heat-dissipating device for electronic devices, more specifically, to a cooling pad for laptop-style portable computers and the like.

2. Description of the Related Art

A computer being a collection of processing units, memories, graphic processing units and various other electronic components generates substantial amounts of heat as a result of electrical and mechanical resistance from such components. As computing tasks become computation intense, more electricity is drawn and subsequently more heat generated. The introduction of solid state components into electronic devices reduced the amount of heat generated per component, but the benefits were short-lived. As the demands on silicon-based microchips and their abundance in modern computers multiplied, the amount of heat generated increased proportionally. Compounding this increase, personal computers and related electronic appliances containing processors (such will be all referred to as micro computers hereon) have continued to evolve into more lightweight and smaller-sized devices. With the reduction of the physical size of micro computers and their increasing processing power, heat dissipation becomes a major challenge for the computer manufacturers and consumers as traditional cooling methods are no longer effective.

Portable computers present a difficult problem in maintaining proper operating temperatures. Modern portable computers due to their small housing and lightweight characteristics are unable to allow for necessary convection of heat into the surrounding air. The housing of portable computers retains more heat than a normal desktop due to the small volume and reduced airflow. The rate of heat generation in portable computers outpaces the rate of heat expulsion. Furthermore in an effort to minimize noise, weight, and maintain battery life, the common use of fans and heat sinks in desktop computers are limited in portable computers. Most notebook computers accommodate these limitations, in part, by the use of low power consuming components to reduce heat generation. Many incorporate software controls to limit processing power while not in use to maintain a reasonable operating temperature. A substantial amount of heat is retained, however, and interior temperatures may reach a range dangerous to components, as well as reducing the performance and the life span of the notebook computer.

The main heat generating elements in portable computers, the circuitry and processing units, are typically packed close to the bottom-face in order to minimize the housing size. The placement makes the bottom-face a direct gateway for heat dissipation and a logical target to approach the problem of excess heat in portable computers. Although this potential is well recognized, the bottom-face of mobile computers remains the most underutilized surface for heat dissipation. Unfortunately, due to design and ergonomics, the bottom-face is unexposed much of the time to allow effective convection. Heat conduction is unreliable at the bottom-face because of surfaces in contact are usually made of poor thermal conductors, such as wooden desk or a lap. As a result, the bottom-face has universally become the hottest portion of the surface of the mobile computer housing, so hot that it often cannot be placed in contact with human skin or fine furniture. A widely-reported 2004 State University of New York study also found that laptop heat is a threat to fertility of young men, that heat increases scrotum temperatures and thereby lowers sperm counts, and through repeated exposures the damage could even be long term. An effective way to direct heat away from the bottom face of a mobile computer will not only reduce the discomfort of the computer users, but also create a healthier thermal environment around the mobile computer.

Several solutions have been developed to meet this challenge, the most popular a simple cooling fan that forces airflow over the electronic components to increase heat transfer via convection. The overall cooling effectiveness can be increased by simply increasing number of cooling fans inside of a micro computer at critical locations. Another solution is to incorporate heat sinks with heat dissipating fins directly on the electronic components to increase the cooling effectiveness of convection. The two solutions are usually applied in combination to create the satisfactory cooling result. Also known are external pads made of mere insulation material to place between the laptop and the user, exacerbating the problem of cooling the computer but offering some relief from the heat for the user's lap.

Some designs have attempted to dissipate heat through the bottom-face by supporting the notebook computer on a stand to allow forced or natural convection to take place under the notebook computer. The stands using forced convection under the notebook computer use one or more small fans to induce airflow. The small fans in the stand require power, which usually comes from the battery of the mobile computer. This method shortens the span of the mobile operation of the computer, as well as creates additional noise. The natural convection stands simply raise the notebook computer off the surface to allow easier airflow, but are very ineffective. Both present the problem of adding sizable and rigid external components to a mobile computer. Therefore, a better device for cooling the bottom face is desired.

Phase change material (PCM) is a name shared by chemical compounds that possess the physical property of changing between solid phase and liquid phase at a desirable temperature range. Examples of the PCM include compounds such as sodium sulfate decahydrate, sodium carbonate decahydrate, disodium phosphate dodecahydrate or sodium thiosulfate pentahydrate. In the process of a phase change, either melting or solidifying, the material respectively absorbs or releases a large amount of per-mass thermal energy, or "heat of fusion". This process requires very small to no temperature or volume change of the PCM. This property can be utilized to store away excessive heat produced by a micro computer during operation when the PCM turns into liquid, and slowly release the heat when the computer is not being used when the PCM solidifies again. This process can be repeated as desired. Furthermore, this can keep the operational temperature of a micro computer at a relatively stable point. Due to the nature of such heat dissipation, however, the PCM is not suitable as a part the built-in devices of a micro computer, but it works ideally as the main component of a detached, external heat-absorbing device. Because of the fact that liquid does not take a definite form but solid material does, the nature of the phase change process in this application calls for well-designed containment both to control the PCM and to serve the purpose of heat dissipation.

SUMMARY OF THE INVENTION

A separate, external cooling pad for use between the user's lap and the hot, bottom surface of a conventional laptop computer includes a flexible housing with a top portion made of a liquid impermeable material and divided into a number of pockets containing phase change material. The pockets are preferably formed by a number of press seals to limit or entirely prevent shifting of the phase change material about the top portion of the housing. The press seals may be stitching or some other way of subdividing the top portion of the housing. The phase change material is preferably sodium sulfate decahydrate, sodium carbonate decahydrate, disodium phosphate dodecahydrate, or sodium thiosulfate pentahydrate.

The housing is preferably in the form of a sleeve having a bottom portion connected to the top portion on three sides and defining an opening for storage of the computer inside when not in use. Preferably some way of closing the opening of the sleeve is provided such a zipper. The housing is preferably of a fabric material and the bottom portion preferably neoprene. These and other features and advantages of the present invention will become apparent upon reading the following detailed description and upon reference to the accompanying drawings.

BRIEF DESCRIPTION OF THE SEVERAL VIEWS OF THE DRAWINGS

FIG. 6 is a plan view of an alternate embodiment of the top portion;

FIG. 7 is plan view of another alternate embodiment of the top portion;

FIG. 8 is plan view of yet another alternate embodiment of the top portion;

DESCRIPTION OF THE PREFERRED EMBODIMENT(S)

Figure 1:
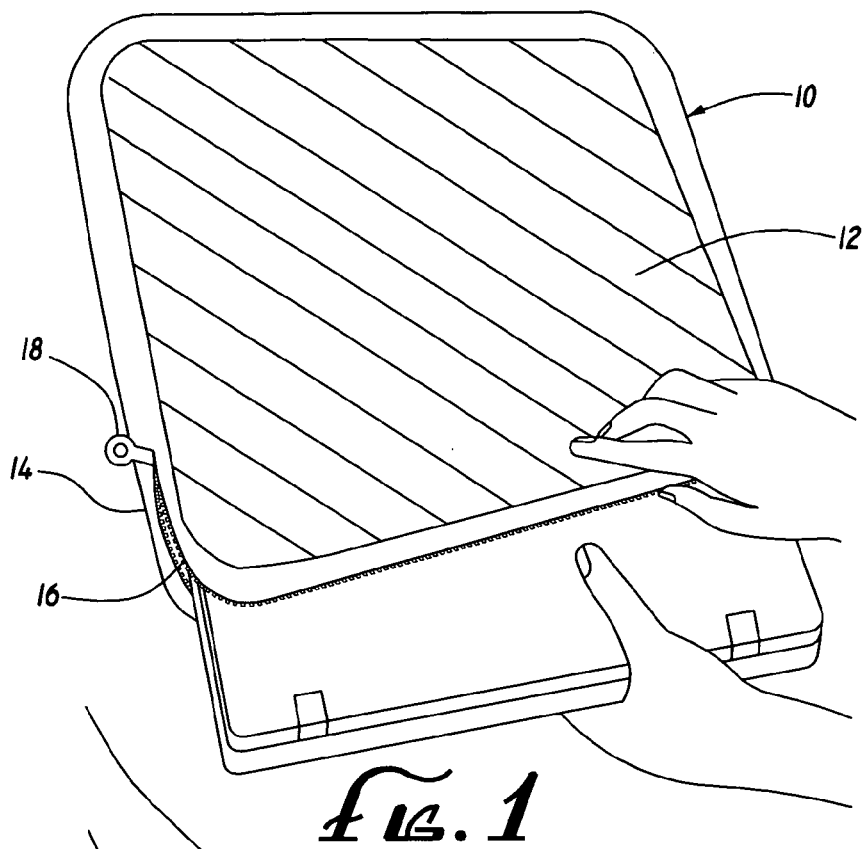
FIG. 1 is a perspective view of the preferred embodiment cooling pad sleeve and a conventional laptop computer.

First referring to FIG. 1, the preferred embodiment of the present invention may be described. The cooling pad 10 for a conventional laptop computer is in the form of a flexible sleeve having a top portion 12 and a bottom portion 14 connected together on three (3) sides. Across the fourth side is an opening 16 and a zipper 18 or some other fastening or closing means. The bottom portion 14 is made of a neoprene fabric although many other materials would also suffice. The sleeve may serve as the user's laptop bag or cover, or alternatively if the user already has a heavy-duty computer case the sleeve becomes a lightweight accessory that may be rolled up or folded and stowed in the case when not in use.

A rigid board material (not shown) may be placed inside the sleeve to provide a stiffer structural support for the laptop if desired.

Figure 3:
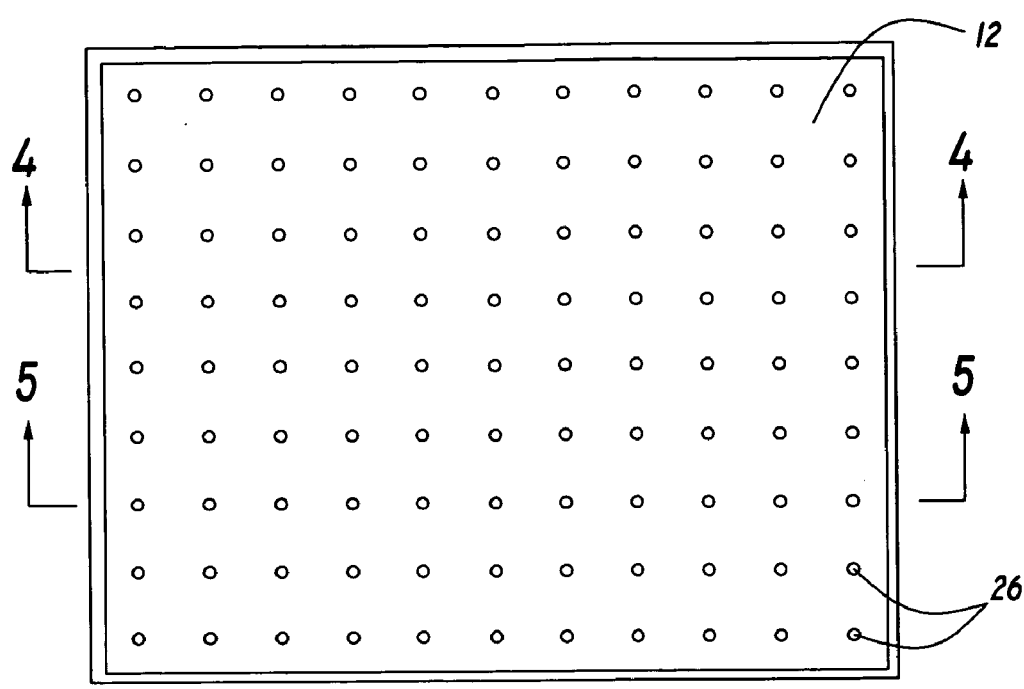
FIG. 3 is plan view of the top portion of the cooling pad.
Figure 4:
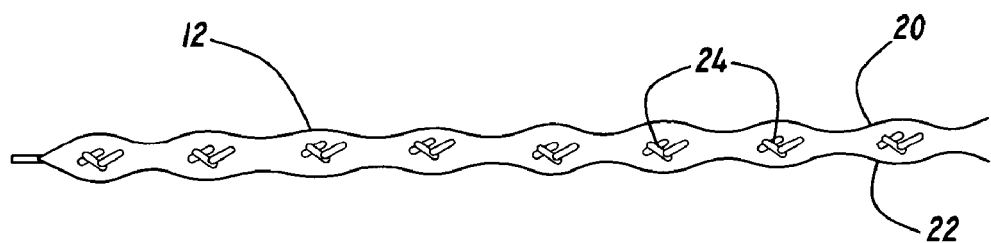
FIG. 4 is section view of the top portion of the cooling pad.
Figure 5:
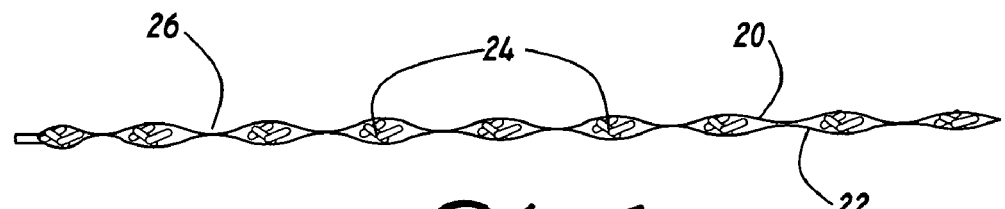
FIG. 5 is another section view of the top portion of the cooling pad.

Now also referring to FIGS. 3-5, the top portion 12 of the preferred embodiment cooling pad 10 may be further described, which includes upper 20 and lower 22 layers of liquid-impervious fabric, connected together around the perimeter and further there are press seal means distributed about the top portion. Examples of the liquid-impervious fabric include plastic, rubber or polyvinyl chloride (PVD). Between the fabric layers 20, 22 are a large number of small pellets 24 of a phase change material (PCM), such as sodium sulfate decahydrate, sodium carbonate decahydrate, disodium phosphate dodecahydrate, sodium thiosulfate pentahydrate or equivalent. There are also a number of press seal means 26 that bring together the upper 20 and lower layers serving to subdivide the top portion 12 into pockets. This helps maintain a relatively equal distribution of the pellets 24 across the top portion 12 of the cooling pad 10.

FIGS. 6-8 show alternate configurations of the press seal means 26. FIG. 6 shows a random distribution across the top portion 12. FIG. 7 shows a stitching pattern 28 that might be employed. FIG. 8 shows a stitching pattern 30 that forms closed pockets preventing any shifting of the pellets 24 between pockets.

Figure 2:
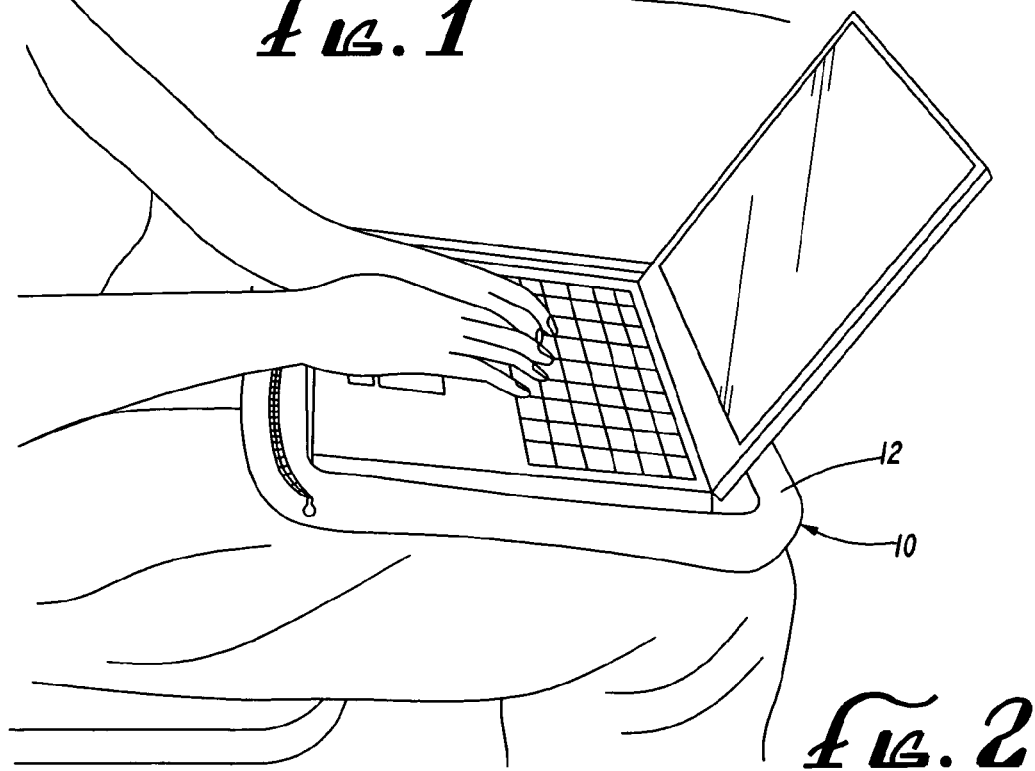
FIG. 2 is a perspective view of the preferred embodiment in use.

Having described the structure of the preferred embodiment cooling pad 10, it is now possible to describe its operation, function and use. Referring to FIG. 2, the cooling pad 10 is placed outside and under the computer in a way such that the pad 10 comes into contact with the bottom face of the computer over a large enough area to allow effective heat transfer away from the computer housing via conduction. The pad 10 may also be placed on the user's lap between the user and the laptop. As described above, the top portion 12 of the pad 10 contains a type of PCM pellets 24 as the main coolant, and the fabric layers 20, 22 may be made of any material that will contain the PCM in either physical state. As heat transfers into the pellets 24 they will begin and eventually complete the phase change process from a solid into a liquid, thereby absorbing substantial amounts of heat rather than reflecting that heat back into the computer or passing it through to the user's lap.

The physical design of the pad ensures the top portion 12 of the pad 10 including the distribution of the pellets 24 therein is largely unchanged as used. That is, the overall shape and thickness will remain about the same, and if necessary, unless the closed pocket design of FIG. 8 is used, the pellets 24 can be readjusted inside the top portion 12 back to an even distribution. The heat transfer between different regions of the pad 10 is also preserved and maximized.

Figure 9:
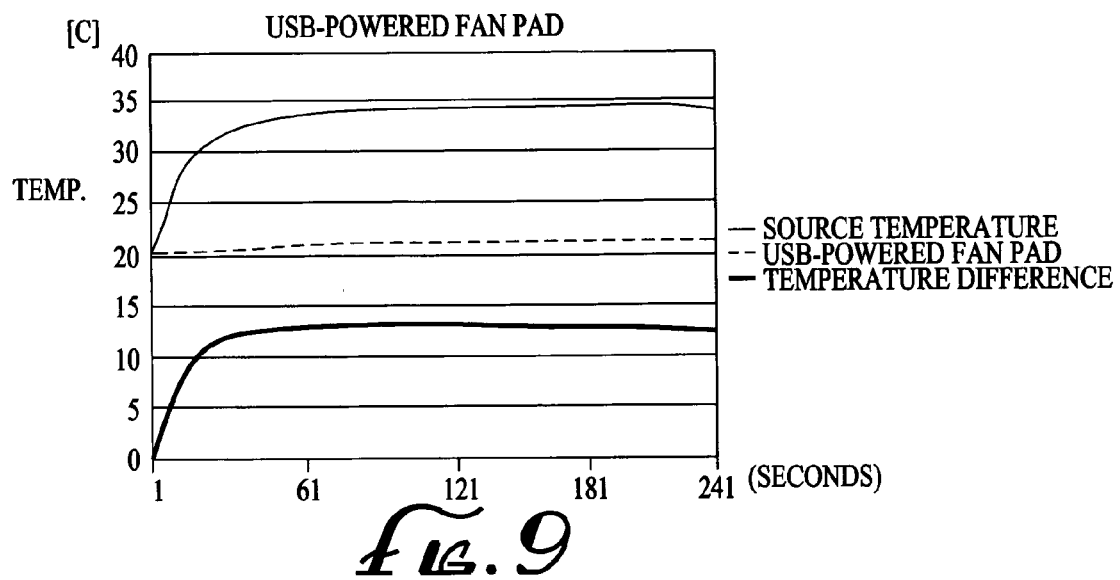
FIG. 9 is chart showing cooling of a laptop computer with a conventional internal fan.
Figure 10:
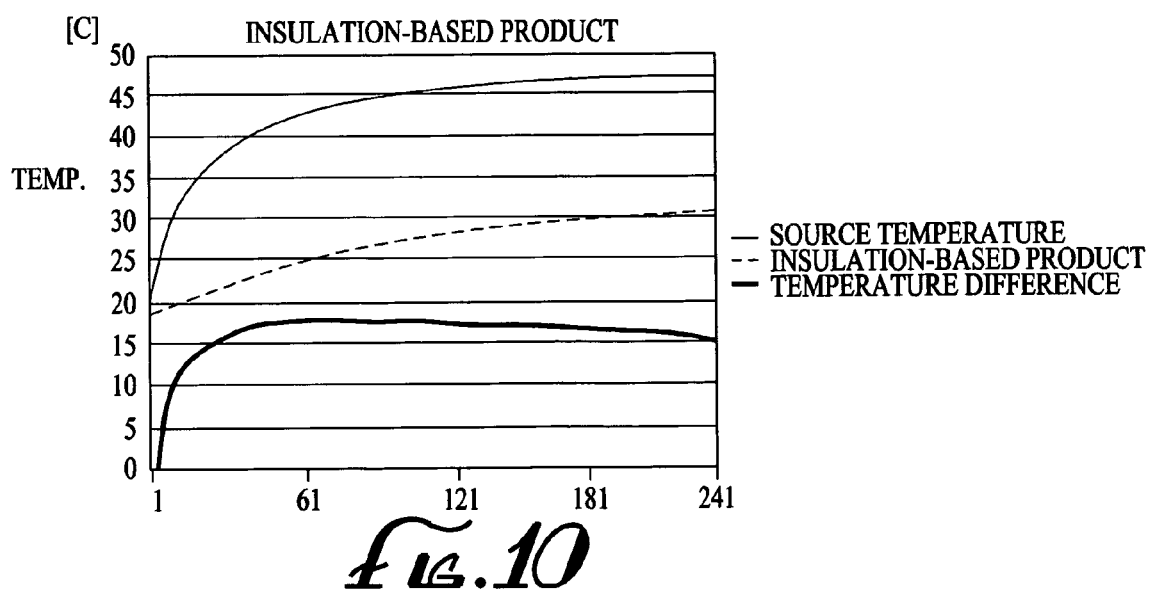
FIG. 10 is chart showing laptop temperatures with a conventional external insulation pad.
Figure 11:
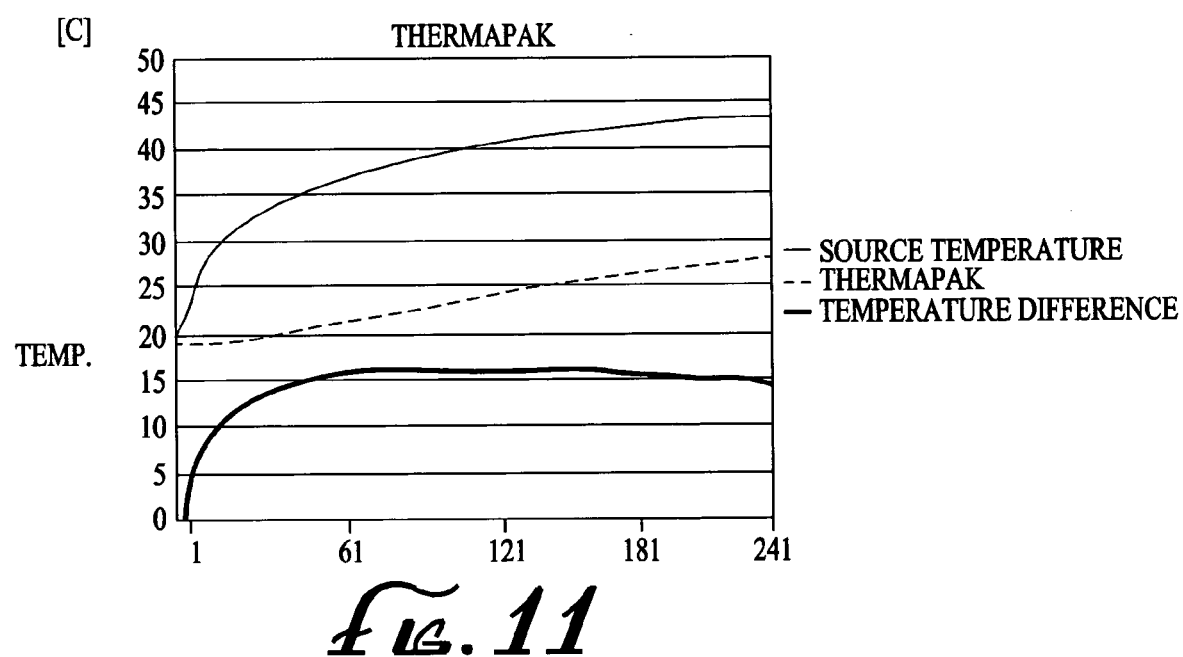
FIG. 11 is a chart showing laptop temperatures with use of the preferred embodiment.

The pad 10 does not require electrical power to operate, and will effectively and efficiently reduce the operating temperature inside a micro computer's housing through conductive heat dissipation via the bottom face of the computer. The computer realizes substantial power savings from the fan not needing to operate or operating less of the time, translating into longer battery life (approx. 20%). The lower internal temperatures may also increase the performance of the computer. Referring to FIGS. 9-11, the charts show the source or laptop computer temperature, fan, insulation layer or cooling pad 10 (Thermapak™) temperatures, and the difference between the two. Note the Thermapak laptop operates at the lowest temperature as the Thermapak take away more heat.

The present invention has been described in connection with preferred and alternate embodiments, but it is understood that modifications will occur to those skilled in the appertaining arts that are within the spirit of the invention disclosed and within the scope of the claims.

What is claimed is:

1. A separate external cooling pad for a conventional laptop computer having a bottom surface through which heat is dissipated, the cooling pad comprising:
    a generally planar rectangular-shaped flexible housing of a size corresponding to the bottom surface of the laptop computer;
    the housing having a top portion defining a sealed compartment internally divided into a plurality of approximately equal sized pockets;
    phase change material disposed inside the pockets, adjacent pockets being in open communication one with the other, the phase change material movable between adjacent pockets substantially all of the top portion;
    whereby the top portion of the cooling pad may be placed between the bottom surface of the laptop computer and the user's lap, to absorb the heat from the computer and preventing the heat from reaching the user.

2. The external cooling pad of claim 1 wherein the housing further comprises a bottom portion similarly shaped as the top portion and connected to the top portion on three sides to form a sleeve with an opening for storing the conventional laptop computer when not in use.

3. The external cooling pad of claim 1 wherein press seal means divide the top portion into the plurality of pockets.

4. The external cooling pad of claim 3 wherein the press seal means are a stitching pattern.

5. The external cooling pad of claim 1 wherein the pockets are entirely closed such that the phase change material cannot pass between pockets.

6. The external cooling pad of claim 2 further comprising a closing means across the opening.

7. The external cooling pad of claim 6 wherein the closing means is a conventional zipper.

8. The external cooling pad of claim 1 wherein the phase change material is selected from the group consisting of sodium sulfate decahydrate, sodium carbonate decahydrate, disodium phosphate dodecahydrate and sodium thiosulfate pentahydrate.

9. The external cooling pad of claim 1 wherein the housing is a fabric material.

10. The external cooling pad of claim 9 wherein the top potion is a liquid impermeable material.

11. The external cooling pad of claim 9 wherein the housing bottom portion is a neoprene material.

12. A separate external cooling pad integrated into a case for a conventional laptop computer having a bottom surface through which heat is dissipated, the cooling pad comprising:
    a generally planar rectangular-shaped flexible housing of a size corresponding to the bottom surface of the laptop computer;
    the housing having a top portion made of a liquid impermeable material and defining a sealed compartment, press seal means internally dividing the top portion compartment into a plurality of approximately equal sized pockets;
    phase change material disposed inside the pockets, the phase change material movable between adjacent pockets substantially throughout the top portion;
    wherein the housing further comprises a bottom portion similarly shaped as the top portion and connected to the top portion on three sides to form a sleeve with an opening for storing the conventional laptop computer when not in use;
    whereby the top portion of the cooling pad may be placed between the bottom surface of the laptop computer and the user's lap, to absorb the heat from the computer and preventing the heat from reaching the user.

13. The external cooling pad of claim 12 wherein the pockets are entirely closed such that the phase change material cannot pass between pockets.

14. The external cooling pad of claim 12 further comprising a closing means across the opening.

15. The external cooling pad of claim 14 wherein the closing means is a conventional zipper.

16. The external cooling pad of claim 12 wherein the phase change material is selected from the group consisting of sodium sulfate decahydrate, sodium carbonate decahydrate, disodium phosphate dodecahydrate and sodium thiosulfate pentahydrate.

17. The external cooling pad of claim 12 wherein the housing is a fabric material.

18. The external cooling pad of claim 12 wherein the housing bottom portion is a neoprene material.

* * * * *